(12) United States Patent
Seydelmann et al.

(10) Patent No.: US 11,292,007 B2
(45) Date of Patent: Apr. 5, 2022

(54) CUTTING DEVICE; SEPARATOR; METHOD FOR SEPARATING FOOD COMPONENTS BY MEANS OF A SEPARATOR

(71) Applicant: Maschinenfabrik Seydelmann KG, Stuttgart (DE)

(72) Inventors: Andreas Seydelmann, Stuttgart (DE); Sven Leinmueller, Moegglingen (DE)

(73) Assignee: Maschinenfabrik Seydelmann KG, Stuttgart (DE)

( * ) Notice: Subject to any disclaimer, the term of this patent is extended or adjusted under 35 U.S.C. 154(b) by 142 days.

(21) Appl. No.: 16/819,481

(22) Filed: Mar. 16, 2020

(65) Prior Publication Data

US 2020/0298245 A1 Sep. 24, 2020

(30) Foreign Application Priority Data

Mar. 18, 2019 (DE) ..................... 10 2019 106 758.8

(51) Int. Cl.
| | |
|---|---|
| *B02C 17/02* | (2006.01) |
| *B02C 17/00* | (2006.01) |
| *A22C 17/00* | (2006.01) |
| *B02C 18/30* | (2006.01) |

(52) U.S. Cl.
CPC .......... *B02C 17/002* (2013.01); *A22C 17/004* (2013.01); *A22C 17/0026* (2013.01); *B02C 17/02* (2013.01); *B02C 2018/308* (2013.01)

(58) Field of Classification Search
CPC ... B02C 17/002; B02C 17/02; B02C 17/0026; B02C 17/004; B02C 18/362; B02C 18/301; B02C 18/308; A22C 17/004; A22C 17/04
See application file for complete search history.

(56) References Cited

U.S. PATENT DOCUMENTS

| | | | |
|---|---|---|---|
| 3,340,917 A | 9/1967 | Vedvik | |
| 4,180,212 A | 12/1979 | Witte | |
| 4,546,927 A | 10/1985 | Bloome et al. | |
| 4,549,330 A * | 10/1985 | Ziolko | A22C 11/108 |
| | | | 452/46 |
| 5,145,450 A * | 9/1992 | Staudenrausch | A22C 11/107 |
| | | | 452/47 |
| 5,156,566 A * | 10/1992 | Righele | A22C 11/006 |
| | | | 452/46 |
| 6,045,445 A * | 4/2000 | Hummel | A22C 11/006 |
| | | | 452/46 |

(Continued)

FOREIGN PATENT DOCUMENTS

| | | |
|---|---|---|
| DE | 21 54 353 C2 | 7/1982 |
| DE | 35 11 643 A1 | 10/1985 |
| DE | 195 16 716 A1 | 11/1996 |

(Continued)

OTHER PUBLICATIONS

European Search Report dated Jun. 2, 2020 in European Application No. 20020122.6 with English translation of the relevant parts.

*Primary Examiner* — Richard T Price, Jr.
(74) *Attorney, Agent, or Firm* — Collard & Roe, P.C.

(57) ABSTRACT

A cutting device, a separator and a method for separating food components using a separator compensates the effects which an increasing wear on a cutting tool arranged on a rotating body have on comminuting a foodstuff by movably arranging the cutting tool on the rotating body.

29 Claims, 8 Drawing Sheets

(56) References Cited

U.S. PATENT DOCUMENTS

2004/0072523 A1* 4/2004 Stimpfl ............... A22C 11/006
　　　　　　　　　　　　　　　　　　　452/49
2010/0018364 A1* 1/2010 Chervenak ............... B25B 7/10
　　　　　　　　　　　　　　　　　　　81/413

FOREIGN PATENT DOCUMENTS

| DE | 10 2011 008 389 B4 | 7/2012 |
| DE | 10 2017 003 407 B3 | 9/2018 |
| DE | 10 2017 003 406 A1 | 10/2018 |
| EP | 0 750 943 A1 | 1/1997 |

* cited by examiner

CUTTING DEVICE; SEPARATOR; METHOD FOR SEPARATING FOOD COMPONENTS BY MEANS OF A SEPARATOR

CROSS REFERENCE TO RELATED APPLICATIONS

Applicant claims priority under 35 U.S.C. § 119 of German Application No. 10 2019 106 758.8 filed Mar. 18, 2019, the disclosure of which is incorporated by reference.

BACKGROUND OF THE INVENTION

1. Field of the Invention

The invention relates to a cutting device, a separator, and a method for separating food components by means of a separator.

2. Description of the Related Art

In prior art, meat grinders are used to comminute foods, such as meat, fish, vegetables, tofu and cheese. Known from Patent Specification DE 10 2011 008 389 B4 is a grinder for comminuting foods with a discharging means for removing undesired, solid components from the foods, which has at least a separating blade, a perforated plate and a support means for supporting the perforated plate, wherein the discharging means is provided at least sectionally on the support means, designed integrally with the latter, and arranged inside of a web of the support means. The disadvantage here is that the cutting means are highly subject to wear, so that the service life must be viewed as rather limited.

Additionally known from Patent Specification DE 21 54 353 C2 is a cutting machine for meat products or the like with a cutter assembly comprised of at least one rotating blade with at least one shear edge, which near its inner end has allocated to it a channel for discharging cut product pieces, which leads through a center hole of the perforated plate that is downstream from the blade and acts as a counter-blade, wherein the discharge channel leads into a collection cap bordering a collection chamber, wherein the parts of the shear edge lying further outside lead the parts of the shear edge lying further inside in the rotational direction of the blade, and a discharge pipe is guided out of the collection chamber of the collection cap, having incorporated into it a device that can change and adjust its passage cross section, e.g., a tap. In this solution as well, the cutter assembly is highly subject to wear, so that limited service lives must likewise be expected.

Additionally known from Patent Specification DE 10 2017 003 407 B3 is a device for comminuting foods, which has a cutting means as well as a pressure housing with a cylindrical drum wall, wherein the pressure housing is formed with an inlet opening for the food at a first end section, and a screw conveyor is rotatably mounted in the pressure housing, which has several screw chambers separated from each other by at least one helical mount, wherein the screw conveyor on the cutting means side has a worm shaft with a constant diameter, which is adjoined by a tapered section of the worm shaft in the direction of the first end section as far as the smaller diameter, wherein the cutting means consists of a drum wall section, which incorporates several cutting openings, and a section of the at least one helical mount that passes over the cutting openings. It is advantageous that the previously known device for comminuting foods improves the supply of the food to be comminuted to the cutting means, while at the same time increasing its own service life. However, the disadvantage is that high costs are associated with exchanging a worn screw conveyor having a screw helix, which as wear rises leads to an increasingly unsatisfactory result while comminuting the food, since a gap width between the drum and screw helix gets larger, or that reconditioning a worn screw conveyor is time intensive. This disadvantage also exists in the tube grinder previously known from published patent application DE 195 16 716 A1.

Additionally known from Patent Specification U.S. Pat. No. 3,340,917 A is a machine for the high-speed comminuting of meat or similar products, which consists of a housing that incorporates a cylindrical, perforated cutting insert, which separates a product receiving chamber and a product discharging chamber, a hollow, rotating shaft mounted concentrically in the cylindrical cutting insert, knife holders that are mounted on the shaft and glidingly incorporate pistons, wherein the pistons hold blades that are made to press against the interior surface of the cutting insert, e.g., by compressed air. The disadvantage here involves the high structural outlay, as a result of which the machine also requires a great deal of effort to clean.

Therefore, the object of the invention is to provide a cutting device, a separator and a method for separating food components by means of a separator, with which the disadvantages to prior art are overcome.

SUMMARY OF THE INVENTION

By contrast, the advantage to the cutting device according to the invention, the separator according to the invention, and the method according to the invention for separating food components by means of a separator is that the ramifications which an increasing wear on a cutting tool arranged on a rotating body has on the comminution of a food can be compensated for by virtue of the fact that the cutting tool (cutting means) is movably arranged on the rotating body. The movability of the cutting tool allows the gap width necessary for a high-quality comminution of the food to be retained between a drum and a cutting tool for a longer time, so that the cutting tool can be used for a longer time despite the increasing wear. In addition, exchanging a cutting tool is only associated with a low cost. Furthermore, a conventional separator can also be retrofitted with a cutting device according to the invention.

In an advantageous embodiment of the cutting device according to the invention, at least one cutting tool is arranged on the rotating body so that it can be moved at least in part radially and/or at least in part in the circumferential direction.

In an additional advantageous embodiment of the cutting device according to the invention, the rotating body has a first end and a second end, wherein a diameter of the rotating body present at the first end is equal to or less than a diameter of the rotating body present at the second end. Also conceivable in particular are the following embodiments of the rotating body, which can induce a change in the volume flow:

Rotating body, cylindrical
Rotating body smaller in diameter at the first end
Rotating body as a screw and cylindrical
Rotating body as a screw and smaller in diameter at the first end
Rotating body as a screw and cylindrical, the screw core cylindrical in diameter at the first end Rotating body as a screw and cylindrical, the screw core smaller in diameter at the first end Rotating body as a screw and cylindrical, the screw threads constant/narrower/wider in pitch Rotating body smaller in diameter at the first end, the screw core cylindrical in diameter at the first end Rotating body smaller in diameter at the first end, the screw core smaller in diameter at the first end Rotating body smaller in diameter at the first end, the screw threads constant/narrower/wider in pitch.

In an additional advantageous embodiment of the cutting device according to the invention, at least one cutting tool movably arranged on the rotating body is arranged in a groove arranged on the rotating body.

In a related advantageous embodiment of the cutting device according to the invention, the groove has at least in part a constant depth and/or at least in part an inclined plane over its length.

In an additional advantageous embodiment of the cutting device according to the invention, at least one cutting tool arranged in a groove arranged on the rotating body is arranged so that it can move back and forth in the groove and/or up and down in the groove.

In an additional advantageous embodiment of the cutting device according to the invention, at least one cutting tool movably arranged on the rotating body is non-rotatably arranged on the rotating body.

In an additional advantageous embodiment of the cutting device according to the invention, at least one cutting tool is detachably arranged on the rotating body.

In an additional advantageous embodiment of the cutting device according to the invention, the rotating body has at least one channel.

In a related advantageous embodiment of the cutting device according to the invention, the channel empties into a groove, in which a cutting tool is movably arranged.

In an additional advantageous embodiment of the cutting device according to the invention, the rotating body has an adjusting screw that interacts with at least one movably arranged cutting tool.

In an additional advantageous embodiment of the cutting device according to the invention, at least one cutting tool has a longitudinal axis aligned parallel to the longitudinal axis of the rotating body, and/or at least one cutting tool has a longitudinal axis aligned at an angle to the longitudinal axis of the rotating body.

In an additional advantageous embodiment of the cutting device according to the invention, at least one cutting tool has an at least partially profiled surface. The at least partially profiled surface of the cutting tool supports a movement of the cutting tool initiated by a food. The profile preferably consists of depressions and/or elevations.

In an additional advantageous embodiment of the cutting device according to the invention, at least one cutting tool is a cutting bar.

In a related advantageous embodiment of the cutting device according to the invention, at least locations of the rotating body have at least one screw helix.

In an additional advantageous embodiment of the cutting device according to the invention, at least one screw helix has a varying pitch, and/or at least two screw helixes have varying pitches.

In an advantageous embodiment of the separator according to the invention, which has a drum, which has an inlet opening for loading the drum with a material to be separated, an outlet opening for material that is difficult or impossible to cut, and at least in part cutting openings, through which the cuttable components of the material and/or foreign substances can get out of the drum, and a cutting device arranged inside of the drum, which has a rotating body having a longitudinal axis around which it can rotate in at least one rotational direction, wherein at least one cutting tool is arranged on the rotating body, wherein at least one cutting tool is movably arranged on the rotating body, the outlet opening of the drum can be closed by a closure that has a closed position.

In a related advantageous embodiment of the separator according to the invention, the closure is pressure-loaded and/or a closure flap, making it possible to control a pressure buildup of a material to be separated inside of the drum, and in particular in the area of the cutting tool.

In an additional advantageous embodiment of the separator according to the invention, the closure has at least one spring element. The spring element is preferably a pressure cylinder, which is held by a coupling rod in a position that closes the outlet opening until the pressure transferred by the rotating body to the material that is hard or impossible to cut and/or the foreign substances grows to such an extent that the closure or closure flap is pushed open by the material that is hard or impossible to cut and/or the foreign substances against a closure force applied by the pressure cylinder, and the material that is hard or impossible to cut and/or the foreign substances fall out of the outlet opening. After the material that is hard or impossible to cut and/or the foreign substances have been ejected through the outlet opening, the inner pressure within the drum interior is initially reduced, and the closure force applied by the pressure cylinder is temporarily greater than the pressure of the material that is hard or impossible to cut and/or the foreign substances prevailing in the drum interior, which causes the closure and/or closure flap to again move into a position that closes the outlet opening.

In an additional advantageous embodiment of the separator according to the invention, a gap width present between the cutting tool and drum can be varied by moving the cutting tool.

In an additional advantageous embodiment of the separator according to the invention, the cutting device is a cutting device according to the invention as described above.

In an additional advantageous embodiment of the separator according to the invention, at least one screw helix has a varying pitch, and/or at least two screw helixes have varying pitches.

In an advantageous embodiment of the method according to the invention for separating food components by means of a separator, wherein the separator has a drum, which has an inlet opening for loading the drum with the food to be separated, an outlet opening for components of the material that are hard or impossible to cut and/or foreign bodies (e.g., plastic parts, cable binders, metal parts), which are preferably not cut during the separation process, and at least in part cutting openings, through which the cuttable components of the food can get out of the drum, and a cutting device arranged inside of the drum, which has a rotating body having a longitudinal axis around which it can rotate in at least one rotational direction, wherein at least one cutting tool is arranged on the rotating body, wherein the at least one cutting tool is movably arranged on the rotating body, wherein the movable arrangement at least occasionally allows the cutting tool to be moved by the food located in the drum and/or by an operator located outside of the drum, at least one cutting tool is moved before and/or during the separating process.

In an additional advantageous embodiment of the method according to the invention, the movement of the cutting tool is directed toward the drum.

In an additional advantageous embodiment of the method according to the invention, the movement of the cutting tool varies a gap width present between the cutting tool and drum.

In an additional advantageous embodiment of the method according to the invention, the rotational direction of the rotating body in front of a cutting tool movably arranged on the rotating body causes a pressure buildup, as a result of which at least parts of the food are guided under the cutting tool, so that the cutting tool is moved in the direction of the drum.

In an additional advantageous embodiment of the method according to the invention, the food exerts a pressure on the cutting tool movably arranged on the rotating body, as a result of which the cutting tool is moved in the direction of the drum.

In an additional advantageous embodiment of the method according to the invention, the movement of the cutting tool presses the cutting tool against the drum.

In an additional advantageous embodiment of the method according to the invention, a cutting device according to one aspect of the invention as described above is used as the cutting device, and/or a separator according to another aspect of the invention as described above is used as the separator.

Other advantages and advantageous embodiments of the invention may be gleaned from the following.

BRIEF DESCRIPTION OF THE DRAWINGS

Preferred exemplary embodiments of the subject matter according to the invention are depicted in the drawing, and will be described in more detail below. Shown on.

DETAILED DESCRIPTION OF THE EXEMPLARY EMBODIMENT

Figure 1:
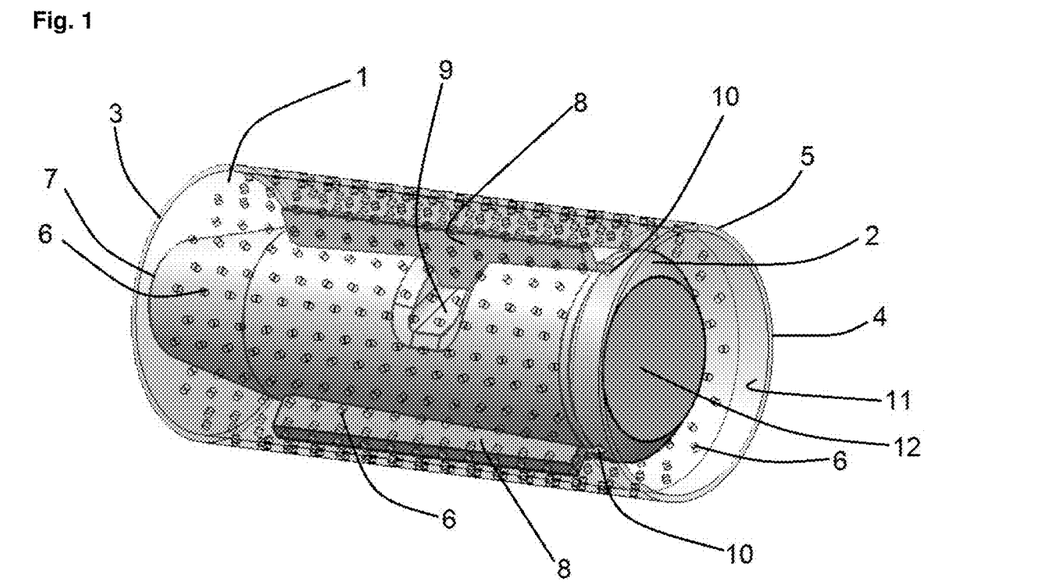
FIG. 1 is a perspective view of a rotating body surrounded by a drum.

FIG. 1 shows a perspective view of a rotating body 2 surrounded by a drum 1 (perforated drum). The drum 1 has an inlet side 3, at which is arranged an inlet opening (not shown in any more detail) for loading the drum 1 with a material to be separated, and an outlet side 4, at which is arranged an outlet opening (not shown in any more detail) for discharging material that is hard or impossible to cut and located in the drum 1. The drum 1 has a drum wall 5, which is penetrated through by cutting openings 6, through which the cuttable material can be transported out of the drum 1. For example, the cutting openings 6 can be designed as a cylindrical bore. Also conceivable is a stepped or conical bore, which produces a lower friction, wherein the bore to the drum interior has a smaller diameter than in the direction of the exterior side. Viewed from the direction of a first end 7, the rotating body 2 can be rotated clockwise around a longitudinal axis (not shown). Owing to the rotational direction, a pressure builds on the material to be separated in front of a cutting tool 8, e.g., which can be designed as a cutting bar. The pressure guides material to be separated via channels 9 to and/or under the cutting tool 8, which is movably arranged in a groove 10. Since the pressure is lower over the cutting tool 8 due to the cutting openings 6 in the drum wall 5, the cutting tool 8 wanders outwardly in the direction of the interior side 11 of the drum wall 5. Since the movable arrangement of the cutting tool 8 in the groove 10 at least occasionally allows the cutting tool 8 to move through the food located in the drum, as a result of which the cutting tool 8 is pressed against the interior side 11 of the drum wall 5, a high-quality comminution of the food can be ensured. The cutting tool 8 movably arranged on the rotating body 2 thus offsets an unavoidable wear on a cutting tool 8 arranged on the rotating body 2, which would lead to an increased gap width between the interior side 11 of the drum wall 5 and the cutting tool 8. The cutting tool 8 is preferably detachably arranged on the rotating body 2, making it easy to replace should the wear be so great as to require its replacement. As a result, the entire rotating body 2 need not be replaced. The rotating body 2 has a diameter which at its first end 7 is preferably equal to or smaller than a diameter present at a second end 12 of the rotating body 2, causing the pressure on the separating material to increase toward the second end 12.

Figure 2:
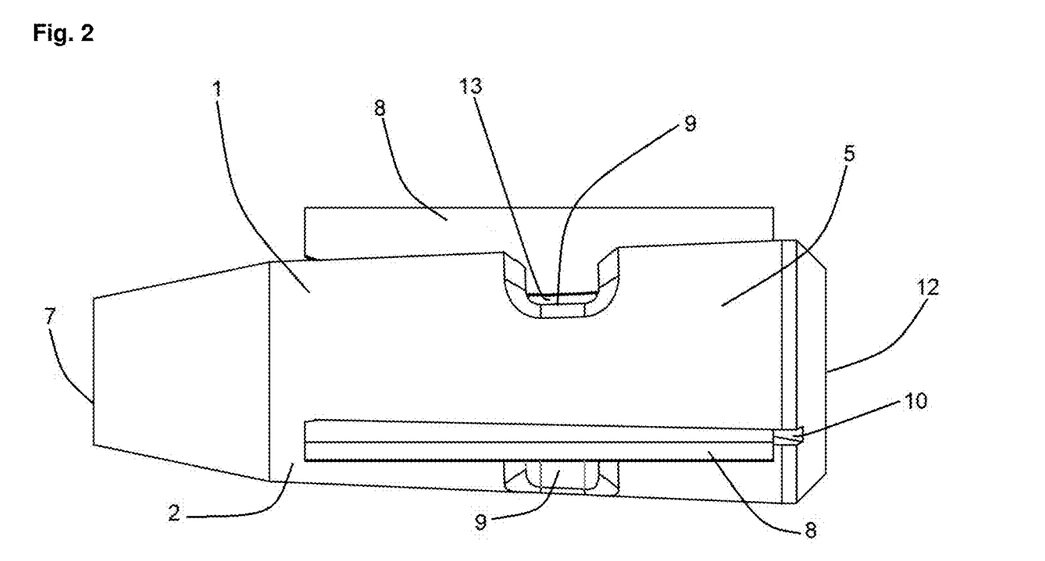
FIG. 2 is a side view of a rotating body according to FIG. 1.

FIG. 2 shows a side view of a rotating body 2 according to FIG. 1. A pressure inlet opening 13 allows the material to be separated to get under the cutting tool 8, as a result of which the cutting tool 8 is moved in the direction of the drum wall.

Figure 3:
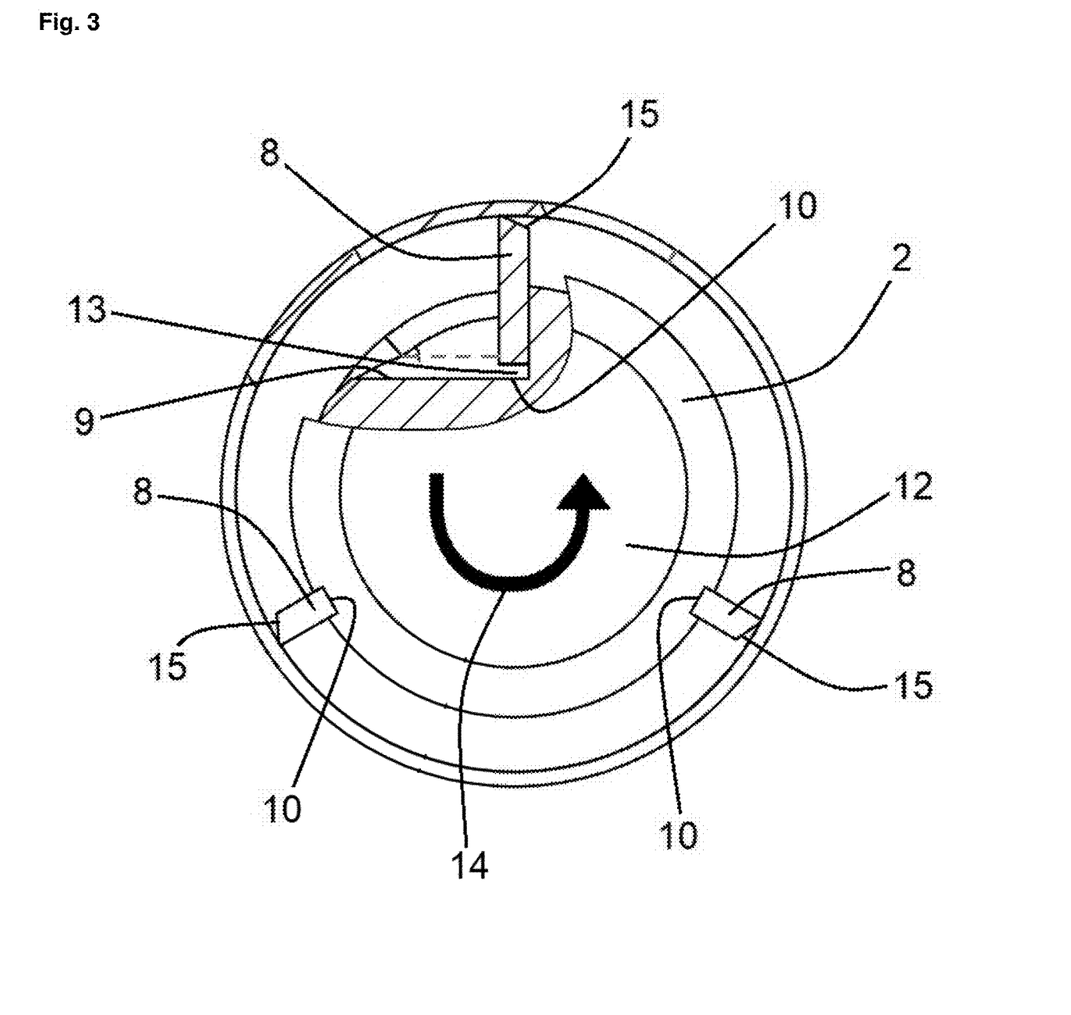
FIG. 3 is a front view of a rotating body surrounded by a drum according to FIG. 1.

FIG. 3 shows a front view of a rotating body 2 according to FIG. 1, which can be rotated around a rotational direction 14. The material to be separated that penetrates into the channel owing to the rotation presses the cutting tool 8 with its cutting edge 15 against the interior side 11 of the drum 1.

Figure 4:
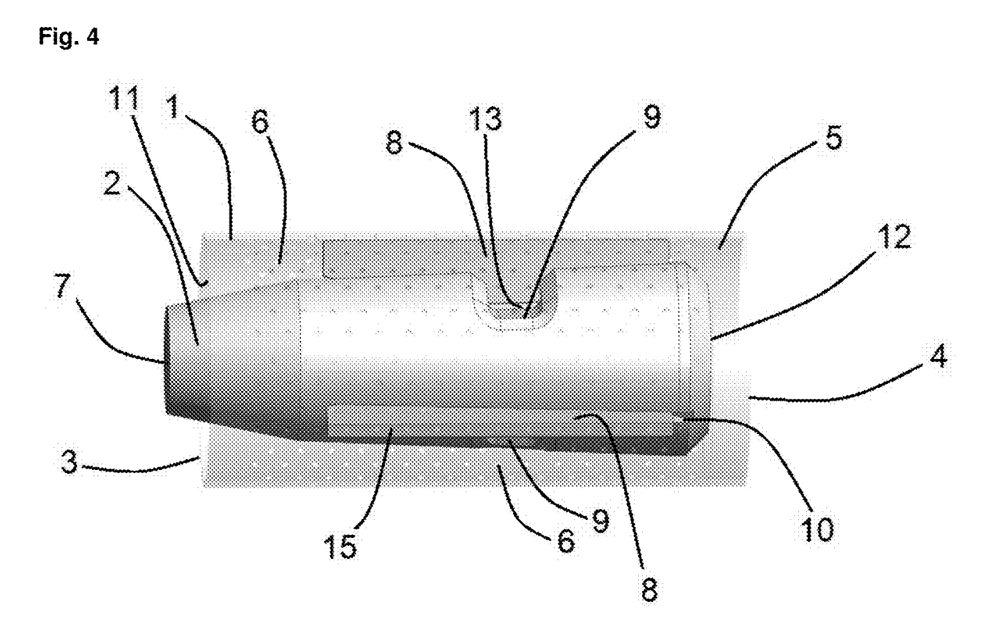
FIG. 4 is a side view of a rotating drum surrounded by a drum according to FIG. 1.

FIG. 4 shows a side view of a rotating body 2 surrounded by a drum 1 according to FIG. 1. In order to load the drum 1 with a material to be separated, a screw conveyor (not shown) can be arranged detachably or fixedly connected to the first end 7 of the rotating body 2.

Figure 5:
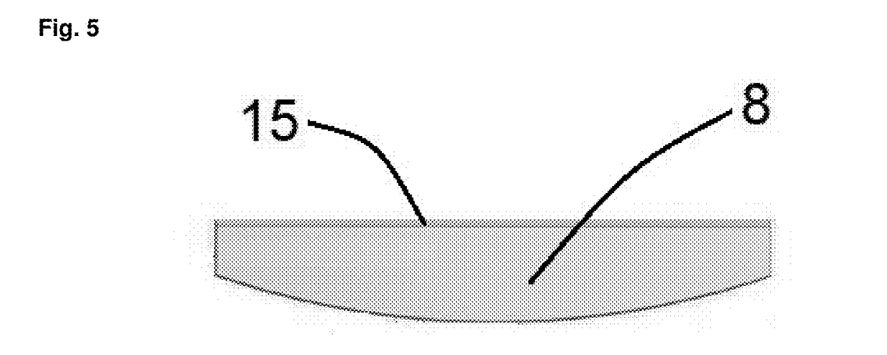
FIG. 5 is a side view of a cutting tool according to one aspect of the invention.

FIG. 5 shows a side view of a cutting tool 8 according to FIG. 1. The cutting tool 8 can be designed like a moon blade (insertable blade).

Figure 6:
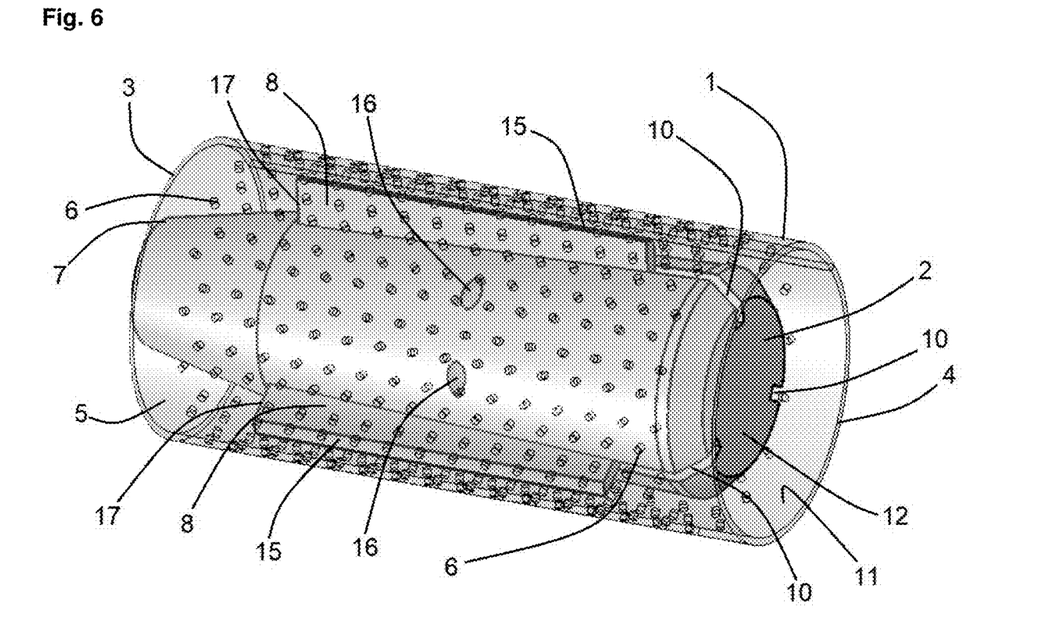
FIG. 6 is a perspective view of a rotating body surrounded by a drum.

FIG. 6 shows a perspective view of a rotating body 2 surrounded by a drum 1. As opposed to the exemplary embodiment shown on FIG. 1 to FIG. 5, which show a dynamic cutting tool (cutting bar) that can be moved by a difference in pressure, this exemplary embodiment involves a dynamic cutting tool 8 (cutting bar) that can be moved by an inclined plane. The cutting tool 8 arranged on the rotating body 2 is pressed toward the right by the product flow of the material to be separated, which in particular hits an end face 17 of the cutting tool 8. An inclined plane presses the cutting tool 8 against the interior side 11 of the drum 1. The contact pressure can be influenced by the angle of the inclined plane. Bolts are preferably inserted into openings 16 to support the inclined plane.

Figure 7:
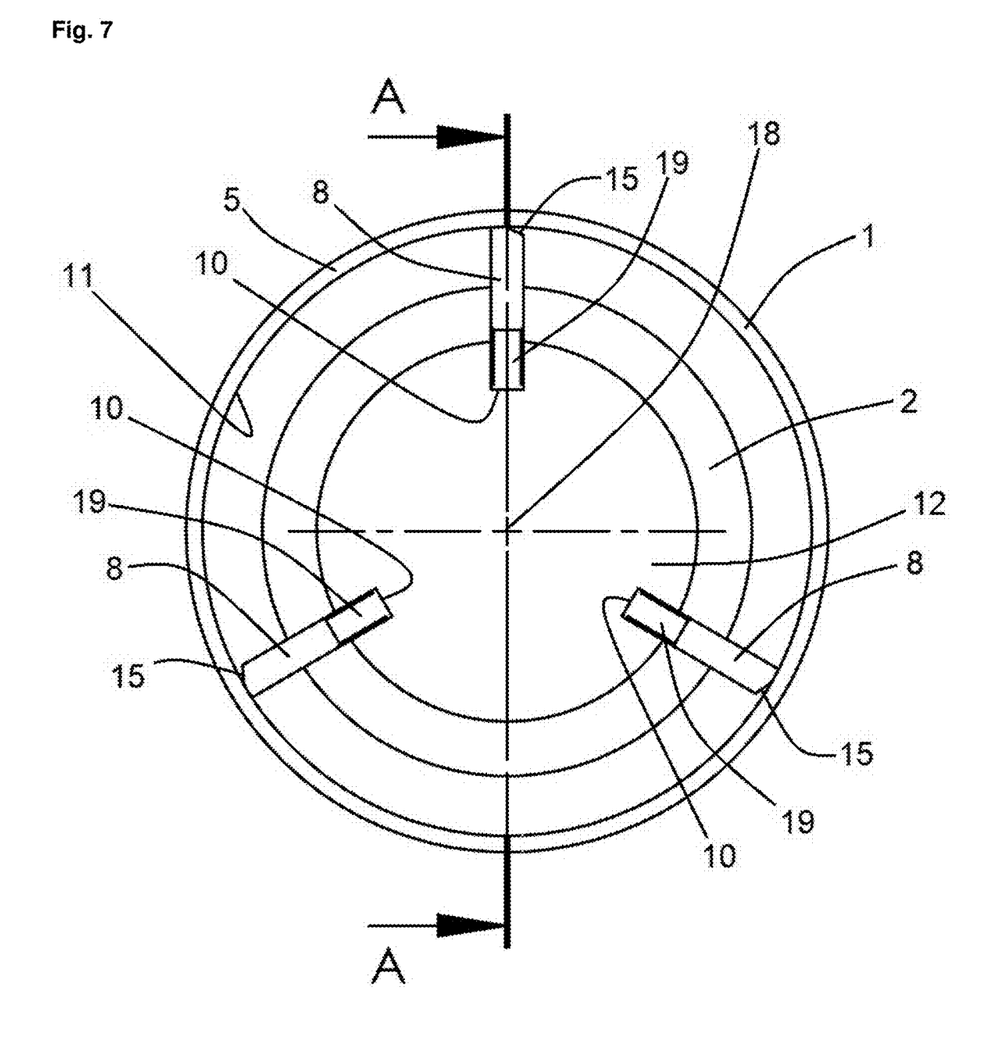
FIG. 7 is a front view of a rotating body surrounded by a drum according to FIG. 6.

FIG. 7 shows a front view of a rotating body 2 surrounded by a drum 1 according to FIG. 6. The rotating body 2 is rotatable around a longitudinal axis 18. The groove 10 is designed as an inclined plane 19.

Figure 8:
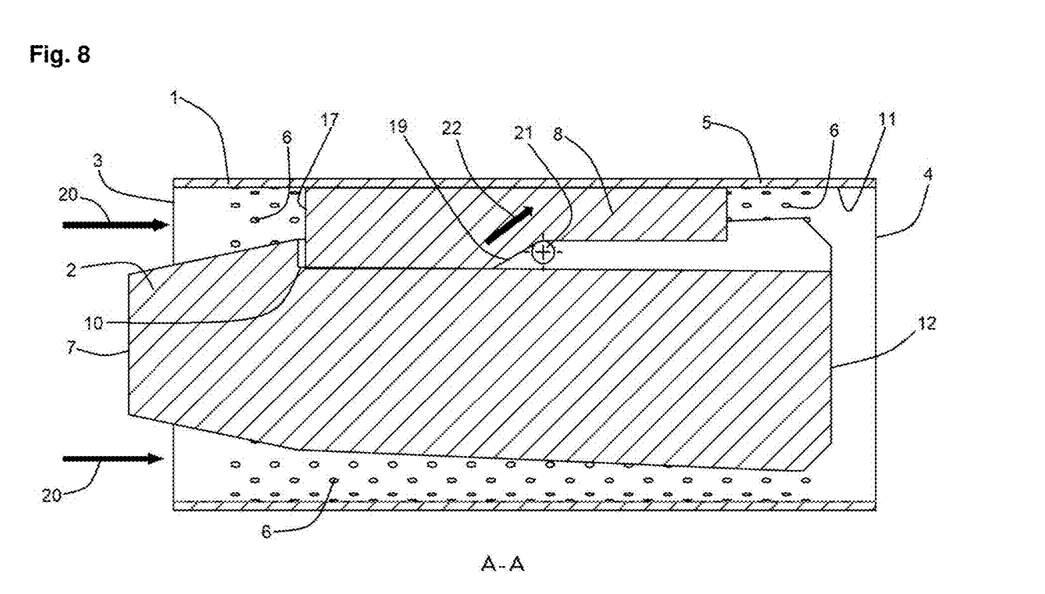
FIG. 8 is a sectional view of the rotating body surrounded by a drum along the A-A line on FIG. 7.

FIG. 8 shows a sectional view of the rotating body 2 surrounded by a drum 1 along the A-A line on FIG. 7. The cutting tool 8 arranged on the rotating body 2 is pressed toward the right by the product flow 20 of the material to be separated, which in particular hits an end face 17 of the cutting tool 8. The inclined plane 19 supported by a bolt 21 presses the cutting tool 8 against the interior side 11 of the drum 1 in the direction of the arrow 22.

Figure 9:
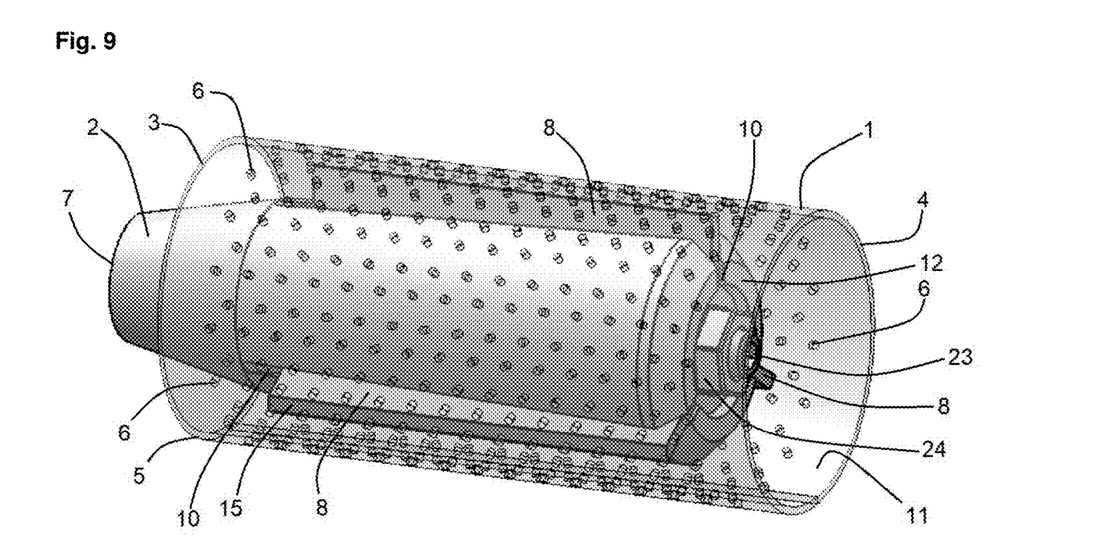
FIG. 9 is a perspective view of a rotating body surrounded by a drum.

FIG. 9 shows a perspective view of a rotating body 2 surrounded by a drum 1. This exemplary embodiment involves an adjustable cutting tool 8 (cutting bar). The cutting tools 8 can be moved on an inclined plane with the help of an adjusting element 24, which is secured by a counter or fastening screw 23, and preferably designed as a nut between the cutting tools 8 and the counter or fastening screw 23.

Figure 10:
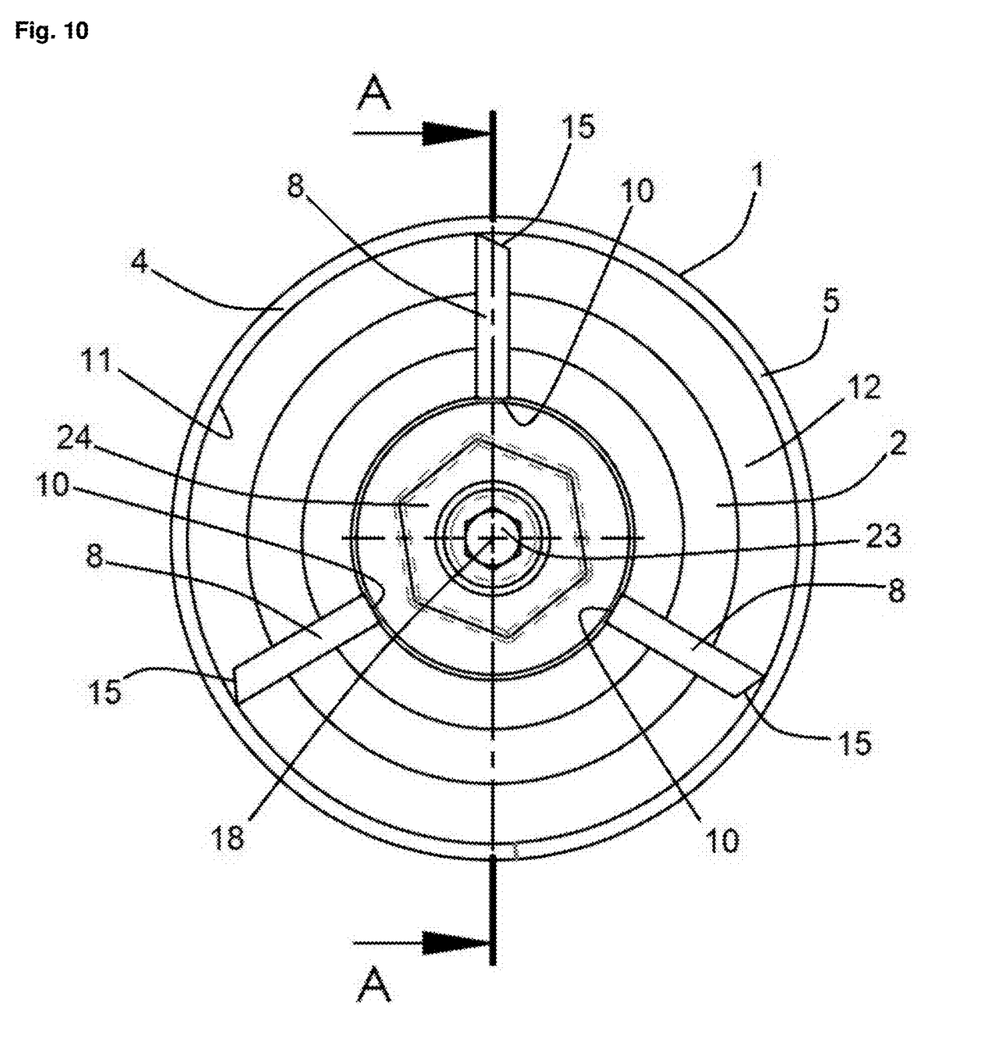
FIG. 10 is a front view of a rotating body surrounded by a drum according to FIG. 9.

FIG. 10 shows a front view of a rotating body 2 surrounded by a drum 1 according to FIG. 9.

Figure 11:
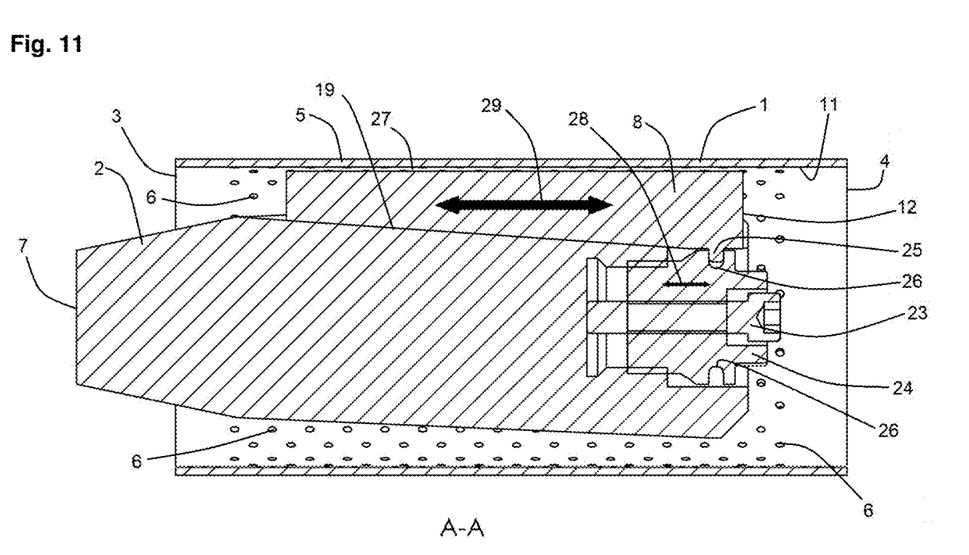
FIG. 11 is a sectional view of the rotating body surrounded by a drum along the A-A line on FIG. 10.

FIG. 11 shows a side view of the rotating body 2 surrounded by a drum 1 along the A-A line on FIG. 10. A cutting tool 8 is statically held in a position desired by an operator (not shown) by a positive connection, for example which can be produced by a lug 25 and a groove 26 arranged on the adjusting element 24. In this way, the gap width 27 between the cutting tool 8 and the drum 1 can be adjusted by an operator (not shown). As opposed to the previously shown exemplary embodiments, the gap width 27 is thus not adjusted by the product flow of the material to be separated, but rather by the operator (not shown). As in the other exemplary embodiments, the cutting tool 8 movably arranged on the rotating body 2 compensates for an unavoidable wear on a cutting tool 8 arranged on the rotating body 2, which would cause an enlargement of the gap width 27 between the interior side 11 of the drum wall 5 and the cutting tool 8. In this exemplary embodiment, the adjusting element 24 is to this end arranged between the cutting tools 8 and the counter or fastening screw 23. By turning the adjusting element 24 in one or the other direction, and having the adjusting element 24 concurrently move in a direction of movement 28, the cutting tools 8 can together be moved back and forth in a direction of movement 29.

All of the features described in the specification, the following claims and the drawing can be essential to the invention, both taken separately and in any combination with each other.

REFERENCE LIST

1 Drum
2 Rotating body
3 Inlet side
4 Outlet side
5 Drum wall
6 Cutting opening
7 First end
8 Cutting tool
9 Channel
10 Groove
11 Interior side
12 Second end
13 Pressure inlet opening
14 Rotational direction
15 Cutting edge
16 Opening
17 End face
18 Longitudinal axis
19 Inclined plane
20 Product flow
21 Bolt
22 Direction of arrow
23 Counter or fastening screw
24 Adjusting element
25 Lug
26 Groove
27 Gap width
28 Direction of movement
29 Direction of movement

The invention claimed is:

1. A cutting device,
with a rotating body that can rotate around a longitudinal axis in at least one rotational direction and
with at least one cutting tool arranged on the rotating body,
wherein
at least one cutting tool is movably arranged on the rotating body, wherein at least one cutting tool movably arranged on the rotating body is arranged in a groove arranged on the rotating body.

2. The cutting device according to claim 1,
wherein
at least one cutting tool is arranged on the rotating body so that it can be moved at least in part radially and/or at least in part in the circumferential direction.

3. The cutting device according to claim 1,
wherein
the rotating body has a first end and a second end, wherein a diameter of the rotating body present at the first end is equal to or less than a diameter of the rotating body present at the second end.

4. The cutting device according to claim 1,
wherein
the groove has at least in part a constant depth and/or at least in part an inclined plane over its length.

5. The cutting device according to claim 1,
wherein
at least one cutting tool arranged in a groove arranged on the rotating body is arranged so that it can move back and forth in the groove and/or up and down in the groove.

6. The cutting device according to claim 1,
wherein
at least one cutting tool movably arranged on the rotating body is non-rotatably arranged on the rotating body.

7. The cutting device according to claim 1,
wherein
at least one cutting tool is detachably arranged on the rotating body.

8. The cutting device according to claim 1,
wherein the rotating body has at least one channel.

9. The cutting device according to claim 8,
wherein
the channel empties into a groove, in which a cutting tool is movably arranged.

10. The cutting device according to claim 1,
wherein the rotating body has an adjusting screw that interacts with at least one movably arranged cutting tool.

11. The cutting device according to claim 1,
wherein at least one cutting tool has a longitudinal axis aligned parallel to the longitudinal axis of the rotating body, and/or at least one cutting tool has a longitudinal axis aligned at an angle to the longitudinal axis of the rotating body.

12. The cutting device according to claim 1,
wherein
at least one cutting tool has an at least partially profiled surface.

13. The cutting device according to claim 1,
wherein
at least one cutting tool is a cutting bar.

14. The cutting device according to claim 1,
wherein
at least locations of the rotating body have at least one screw helix.

15. The cutting device according to claim 14,
wherein
at least one screw helix has a varying pitch, and/or at least two screw helixes have varying pitches.

16. A separator,
with a drum, which has an inlet opening for loading the drum with a material to be separated, an outlet opening for material that is hard or impossible to cut and/or foreign bodies, and at least in part cutting openings, through which the cuttable components of the material can get out of the drum, and
a cutting device arranged inside of the drum, which has a rotating body having a longitudinal axis around which the rotating body can rotate in at least one rotational direction, wherein at least one cutting tool is arranged on the rotating body,
wherein
at least one cutting tool is movably arranged on the rotating body, wherein at least one cutting tool movably arranged on the rotating body is arranged in a groove arranged on the rotating body.

17. The separator according to claim 16,
wherein
the outlet opening of the drum can be closed by a closure that has a closed position.

18. The separator according to claim 17,
wherein
the closure is pressure-loaded and/or a closure flap.

19. The separator according to claim 17,
wherein
the closure has at least one spring element.

20. The separator according to claim 16,
wherein a gap width present between the cutting tool and drum can be varied by moving the cutting tool.

21. The separator according to claim 16,
wherein
the cutting device with a rotating body that can rotate around a longitudinal axis in at least one rotational direction and with at least one cutting tool arranged on the rotating body, wherein at least one cutting tool is movably arranged on the rotating body, wherein at least one cutting tool movably arranged on the rotating body is arranged in a groove arranged on the rotating body.

22. A method for separating food components of using a separator, wherein the separator has a drum, which has an inlet opening for loading the drum with the food to be separated, an outlet opening for components of the food that are hard or impossible to cut and/or foreign bodies, and at least in part cutting openings, through which the cuttable components of the food can get out of the drum, and a cutting device arranged inside of the drum, which has a rotating body having a longitudinal axis around which the rotating body can rotate in at least one rotational direction, wherein at least one cutting tool is arranged on the rotating body,
wherein
at least one cutting tool is movably arranged on the rotating body, wherein at least one cutting tool movably arranged on the rotating body is arranged in a groove arranged on the rotating body, and wherein the movable arrangement at least occasionally allows the cutting tool to be moved by the food located in the drum and/or by an operator located outside of the drum.

23. The method according to claim 22,
wherein
at least one cutting tool is moved before and/or during the separating process.

24. The method according to claim 22,
wherein
the movement of the cutting tool is directed toward the drum.

25. The method according to claim 22,
wherein
the movement of the cutting tool varies a gap width present between the cutting tool and drum.

26. The method according to claim 22,
wherein
the rotational direction of the rotating body in front of a cutting tool movably arranged on the rotating body causes a pressure buildup, as a result of which at least parts of the food are guided under the cutting tool, so that the cutting tool is moved in the direction of the drum.

27. The method according to claim 22,
wherein
the food exerts a pressure on a cutting tool movably arranged on the rotating body, as a result of which the cutting tool is moved in the direction of the drum.

28. The method according to claim 22,
wherein
the movement of the cutting tool presses the cutting tool against the drum.

29. The method according to claim 22,
wherein
a cutting device according to one of claims 1 to 15 is used as the cutting device, and/or a separator according to one of claims 16 to 21 is used as the separator.

* * * * *

UNITED STATES PATENT AND TRADEMARK OFFICE
CERTIFICATE OF CORRECTION

| | | |
|---|---|---|
| PATENT NO. | : 11,292,007 B2 | Page 1 of 1 |
| APPLICATION NO. | : 16/819481 | |
| DATED | : April 5, 2022 | |
| INVENTOR(S) | : Seydelmann et al. | |

It is certified that error appears in the above-identified patent and that said Letters Patent is hereby corrected as shown below:

In the Claims

Column 10, Line 3 Claim 22 after "components" delete "of".

Signed and Sealed this
Tenth Day of May, 2022

Katherine Kelly Vidal
*Director of the United States Patent and Trademark Office*